US006799486B2

(12) United States Patent
Manwaring et al.

(10) Patent No.: US 6,799,486 B2
(45) Date of Patent: Oct. 5, 2004

(54) INTERACTIVE ENERGY ABSORBING SYSTEM

(75) Inventors: Marvin V. Manwaring, Clio, MI (US); Melvin Lee Tinnin, Clio, MI (US); Ravindra Jwalapathy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 178 days.

(21) Appl. No.: 10/165,115

(22) Filed: Jun. 7, 2002

(65) Prior Publication Data

US 2003/0226417 A1 Dec. 11, 2003

(51) Int. Cl.[7] .............................................. B62D 1/18
(52) U.S. Cl. ...................................... 74/493; 280/777
(58) Field of Search ................... 74/492, 493; 280/777, 280/779

(56) References Cited

U.S. PATENT DOCUMENTS

| | | | |
|---|---|---|---|
| 5,390,956 A | * | 2/1995 | Thomas ....................... 280/777 |
| 5,497,675 A | | 3/1996 | Brown et al. |
| 5,562,307 A | * | 10/1996 | Connor ....................... 280/777 |
| 5,605,352 A | | 2/1997 | Riefe et al. |
| 5,669,634 A | | 9/1997 | Heinzman et al. |
| 5,706,704 A | | 1/1998 | Riefe et al. |
| 5,720,496 A | | 2/1998 | Riefe et al. |
| 5,755,461 A | | 5/1998 | Halacka et al. |
| 5,788,278 A | | 8/1998 | Thomas et al. |
| 5,803,496 A | | 9/1998 | Cymbal |
| 5,954,363 A | | 9/1999 | Cymbal et al. |
| 6,062,100 A | | 5/2000 | Sarsfield et al. |
| 6,099,038 A | * | 8/2000 | Jurik et al. ................. 280/777 |
| 6,170,873 B1 | * | 1/2001 | Jurik et al. ................. 280/777 |
| 6,183,012 B1 | | 2/2001 | Dufour et al. |
| 6,264,239 B1 | | 7/2001 | Link |
| 6,264,240 B1 | | 7/2001 | Hancock |
| 6,322,103 B1 | | 11/2001 | Li et al. |
| 6,655,716 B2 | * | 12/2003 | Riefe ........................ 280/777 |
| 2003/0006601 A1 | * | 1/2003 | Byers et al. ................ 280/777 |
| 2003/0042723 A1 | * | 3/2003 | Riefe ........................ 280/777 |
| 2003/0102658 A1 | * | 6/2003 | McCarthy et al. .......... 280/777 |
| 2003/0193180 A1 | * | 10/2003 | Riefe et al. ................ 280/777 |

FOREIGN PATENT DOCUMENTS

EP 1 093 990 A2 9/2000

OTHER PUBLICATIONS

European Search Report, dated Sep. 4, 2003.

* cited by examiner

*Primary Examiner*—David Fenstermacher
(74) *Attorney, Agent, or Firm*—Michael D. Smith

(57) ABSTRACT

An interactive energy absorbing system including a steering column housing that is moveable along a collapse stroke corresponding to a force of impact by an operator. The interactive energy absorbing system includes an energy absorbing component that exerts a resistant force for resisting the movement of the steering column housing along its collapse stroke. The energy absorbing component includes a deformable strap that engages a stationary reaction member and a moveable reaction member. The stationary and moveable reaction members have an adjustable total active surface area for engaging the deformable strap and generating the resistance force. The moveable reaction member moves to adjust the total active surface area due to mechanical translation corresponding to the force of impact by the operator.

25 Claims, 5 Drawing Sheets

INTERACTIVE ENERGY ABSORBING SYSTEM

TECHNICAL FIELD

This invention relates to an interactive energy absorbing system for a motor vehicle steering column, and more particularly, to an interactive energy absorbing system that adapts to the driver loads as the column collapses.

BACKGROUND OF THE INVENTION

Energy absorbing steering columns on a motor vehicle generally include a housing that translates linearly through a collapse stroke during a collision. A force generated by the operator from an impact with the steering wheel generates the force to initiate the collapse stroke. The housing moves against a resisting force produced by an energy absorber that converts a portion of the operator's kinetic energy into work. The resisting force may be generated using several systems known in the art, including the plastic deformation of a metal elementof an energy absorber.

For example, U.S. Pat. No. 3,392,599 discloses an energy absorbing system that utilizes steel spheres that plastically deform the steering column housing by creating tracks in the housing. While the above-referenced design provides for the conversion of kinetic energy of an operator into work by deformation of the steering column housing, the system does not provide varying degrees of resistance based on the force generated by the operator.

An energy absorbing system would ideally convert the kinetic energy of the operator into work at the end of the collapse stroke of the steering column housing. Because designs such as that disclosed in the patent above do not include energy absorbers that are adjustable, optimal energy absorbing performance may not occur for different operators.

Efforts have been made in the art to provide energy absorbing systems that are variable in an effort to achieve a more optimal energy absorbing performance. For example, U.S. Pat. No. 4,886,295 discloses an energy absorbing steering column that includes a plurality of roll deformers positioned in an annulus between the inner tube and a longitudinally split outer tube. An expandable bag containing a fluid is disposed around the outer split tube. A control system varies the fluid pressure within the bag and adjusts the interference fit of the roll deformers between the inner and outer tubes to adjust the energy absorbing characteristics.

While the above-referenced design does include a system that provides for varying energy absorbing performance, the design utilizes complex electronic feedback loops to control the energy absorbing system. There is, therefore, a need in the art for a cost-effective energy absorbing system that does not require electrical inputs and outputs such as sensors and electronically powered motors, but is rather a purely mechanical system. Such a mechanical system would be more cost-effective eliminating the need for costly electronic monitoring systems.

SUMMARY OF THE INVENTION

An interactive energy absorbing system including a steering column housing that is moveable along a collapse stroke corresponding to a force of impact by an operator. The interactive energy absorbing system includes an energy absorbing component that exerts a resistance force for resisting movement of the steering column housing along the collapse stroke. The energy absorbing component includes a deformable strap that engages a stationary reaction member and a moveable reaction member. The stationary and moveable reaction members have an adjustable total active surface area for engaging the deformable strap and generating a resistance force. The moveable reaction member moves to adjust the total active surface area due to mechanical translation that corresponds to the force of impact by the operator.

The interactive energy absorbing system of the present invention has the advantage of providing a cost-effective design that does not utilize complex control systems for adjusting the energy absorbing properties of the system.

The interactive energy absorbing system of the present invention has the further advantage of providing an energy absorbing system that is variable according to the force applied to the steering column by the operator. In this manner, many variables such as the weight of the occupant, the speed at which the car is traveling, and other factors contributing to the force generated by the operator are taken into account to generate an optimal resistance force for an individual operator under a specific set of conditions.

BRIEF DESCRIPTION OF THE DRAWINGS

These and other features and advantages of the present invention will become more readily appreciated when considered in connection with the following detailed description and appended drawings, where.

DETAILED DESCRIPTION OF THE PREFERRED EMBODIMENTS

Figure 1:
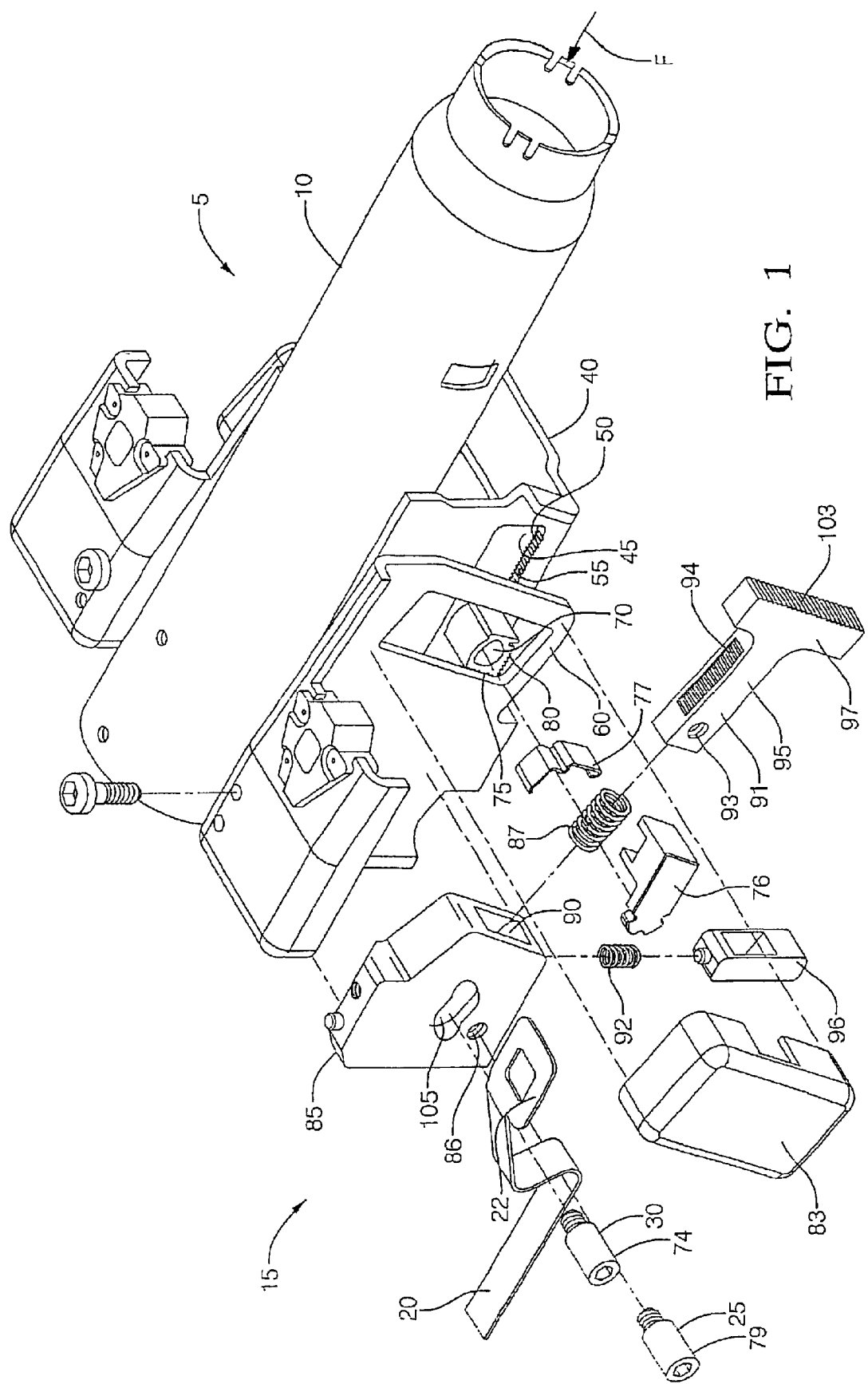
FIG. 1 is an exploded assembly view of a first embodiment of the present invention.
Figure 2:
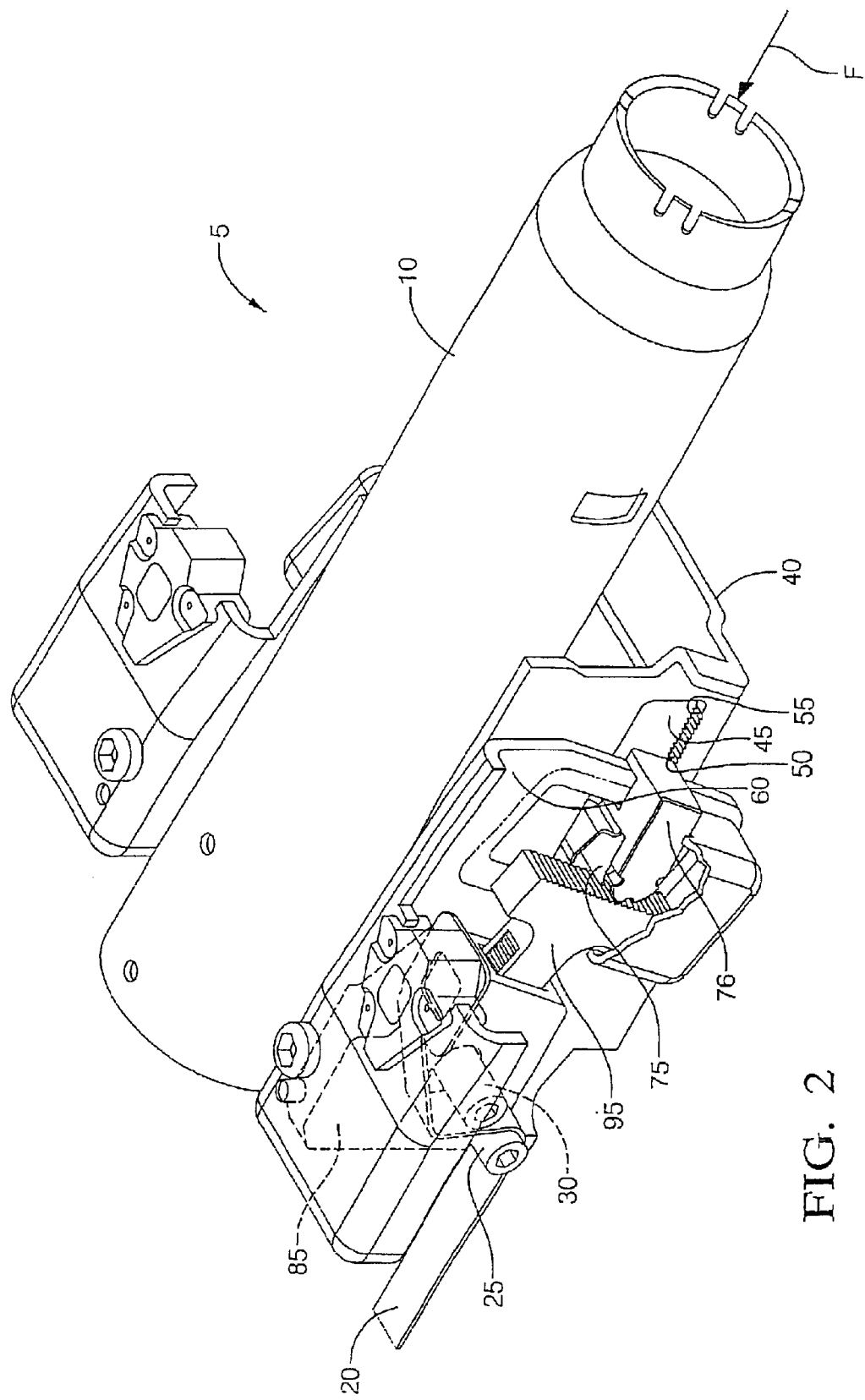
FIG. 2 is an assembled perspective view showing the first embodiment of the present invention.

Referring to FIGS. 1 and 2, there is shown a first embodiment of an interactive energy absorbing system 5 of the present invention in conjunction with a steering column housing 10 that moves along a collapse stroke corresponding to a force of impact by an operator which is represented by the directional force arrow F in FIG. 2.

In a collision, the vehicle body decelerates through the interaction with another body, while the operator maintains his momentum such that he is thrust against the steering hand wheel with a force of impact, again represented by the directional force arrow F. The force of impact by the operator initiates linear translation of the steering column housing 10 in a collapse stroke that is in the direction of a centerline of the steering column 10. An energy absorbing component 15 exerts a resistance force for resisting the movement of the steering column housing 10 along the collapse stroke. The energy absorbing component 15 includes a deformable strap 20 engaging a stationary reaction member 25 and a moveable reaction member 30. The stationary 25 and moveable 30 reaction members have an adjustable total active surface area for engaging the deformable strap 20 and generating a resistance force. The moveable reaction member 30 moves to adjust the total active surface area due to mechanical translation that corresponds to the force of impact by the operator.

Specifically, in the first embodiment, the steering column housing 10 includes a column bracket 40 that is attached to the steering column housing 10. The column bracket 40 includes a slot 45 formed along a length of the column bracket 40 in the direction of the center line of the steering column housing 10. The slot 45 includes teeth 50 formed along a bottom edge 55 of the slot 45. The teeth are designed to engage a tooth lock, as will be discussed in more detail below.

A mounting bracket 60 for attaching a cartridge 85 of the energy absorbing system 5 is attached to a vehicle structure (not shown). The mounting bracket is positioned laterally with respect to the column bracket 45. A bolt 70 is received within the slot 45 of the column bracket 40. The bolt 70 includes a tooth lock 75 formed on an end of the bolt 70. The tooth lock 75 includes teeth 80 that are shaped to engage the teeth 50 formed on the mounting bracket 40. The teeth 80 and 50 are designed such that they provide a positive lock of the mounting bracket 40 and the tooth lock 75, preventing movement in a direction opposite of the force exerted by the operator.

The tooth lock 75 is spaced in an initial position before an impact, from the teeth 50 of the mounting bracket 45 by a frangible position member 76. The frangible position member 76 allows the bolt 70 and tooth lock 75 to freely translate within the slot 45 prior to an impact. As can be seen in FIGS. 1 and 2 the frangible member 76 engages the mounting bracket 60 and tooth lock 75 for maintaining the spacing of the tooth lock 75 in relation to the teeth 50 of the column bracket 45. When a force is exerted on the column housing 10 from an impact with an operator, the frangible member breaks allowing the leaf spring 77 to press the tooth lock 75 into engagement with the teeth 50 of the column bracket 45. After engagement of the tooth lock 75 with the teeth 50 of the column bracket 45, movement of the column housing 10 along its collapse stroke is synchronized with the movement of the tooth lock 75.

Again, with reference to FIGS. 1 and 2, the interactive energy absorbing system 5 of the first embodiment includes an energy absorbing component 15 that comprises an energy absorbing cartridge 85 attached to the mounting bracket 60. The energy absorbing cartridge 85 has a bore that is sized to receive an energy absorbing load adjustor 95. The energy absorbing cartridge 85 also includes a slot 105 formed through the cartridge 85 corresponding to a path of the bore 90. The slot 105 formed in the cartridge receives the moveable reaction member 30 and will be described in more detail below.

The energy absorbing load adjustor 95 is generally a T-shaped member wherein the base portion 91 of the T is received by the bore 90 of the energy absorbing cartridge 85. The base portion 91 includes teeth 94 formed on a top surface that mesh with teeth on an engagement locking member 96. The engagement locking member 96 engages a spring 92 that places a constant bias on the engagement locking member 96 to prevent disengagement from the teeth 104 of the energy load adjustor 95. The top portion 97 of the T is positioned such that it interacts with the tooth lock 75 formed on the end of the bolt 70. The top portion 97 includes teeth 103 formed thereon that engage the tooth lock 75 to provide a positive lock of the energy load adjustor 95 and the tooth lock 75. The base portion of the energy absorbing load adjustor 95 includes a slot for receiving a threaded pin 74 that comprises the moveable reaction member 30. When assembled, the threaded pin 74 is received within the slot 105 formed in the energy absorbing cartridge 85 and screwed into the threaded bore 93 of the energy load adjustor 95. The stationary reaction member 25 also comprising a pin 79 is permanently secured into a threaded bore 86 formed on the energy absorbing cartridge 85. A flat metal strap 20 is permanently mounted to the vehicle structure at an end 22 and positioned such that it can engage both the stationary reaction member 25 and the moveable reaction member 30.

The force required to plastically deform the flat metal strap 20 by pulling it over the reaction members 25, 30 manifests itself as a force resisting the linear translation of the steering column housing 10 in its collapse stroke. Friction between the flat metal strap 20 and the reaction members 25, 30 additionally affects the force resisting the linear translation of the steering column housing 10 in its collapse stroke. The magnitude of the resisting forces attributable to the metal deformation and to friction depend on a number of variables, including the yield strength of the material from which the metal strap 20 is made, as well as the radius of curvature of the reaction members and the area of mutual contact between the metal strap 20 and the reaction members 25, 30.

The energy absorbing cartridge 85 further includes a spring 87 positioned at an end of the bore 90. The spring 87 engages the energy absorbing load adjustor 95 and synchronizes movement of the energy absorbing load adjustor according to the force of impact of the operator.

In operation, at the outset of linear translation of the steering column housing 10 initiated by the impact force "F" on the steering hand wheel, the bolt 70 having the tooth lock 75 formed on an end thereof is urged in the direction of the force "F". The frangible member 76 breaks and allows the leaf spring 75 to bias the tooth lock 75 into engagement with the teeth 50 formed on the column bracket 45. The tooth lock 75 then engages the energy absorbing load adjustor 95 such that the teeth 80 of the tooth lock 75 engage the teeth 103 of the energy load adjustor 95. The tooth lock 75 is therefore engaged with the mounting bracket and energy load adjustor 95 to cause a positive lock of the parts. Movement of the column housing 10 is synchronized and causes movement of the energy absorbing load adjustor 95 in the direction of the force F. The spring 87 contained within the energy absorbing cartridge 85 synchronizes the movement of the energy absorbing load adjustor 95 with the force of impact by the operator. Movement of the energy absorbing load adjustor 95 in turn results in movement of the moveable reaction member 30 in relation to the flat metal strap 20. As the moveable reaction member 30 moves in the direction of the force "F", the active surface area increases, resulting in a more severe plastic deformation of the metal strap 20 across the moveable 30 and stationary 25 reaction members, as well as an increase in the friction between the metal strap 20 and the reaction members 25, 30. Therefore, the force of impact by the operator on the hand wheel results in a mechanical translation of the energy absorbing load adjustor 95, which in turn varies the active surface area for engagement with the metal strap 20. As such, the magnitude of the resistance force against translation of the steering column housing 10 along its collapse stroke is varied in proportion to the impact force of an operator.

The interactive energy absorbing system as disclosed in the first embodiment preferably includes two energy absorbing components 15 positioned on opposite sides of the steering column housing 10.

With reference to FIGS. 3–7, there is shown a second embodiment of the interactive energy absorbing system of the present invention. The second embodiment includes a steering column housing 10 such as the housing 10 of the first embodiment and a rake bracket 120 attached thereto. The rake bracket 120 is coupled to the energy absorbing component 115. The energy absorbing component 115 preferably comprises an energy absorbing capsule 125. The energy absorbing capsule 125 includes a channel 130 formed therein. The channel 130 receives an energy absorbing load adjustor 135. The energy absorbing load adjustor 135 includes a portion 145 having teeth formed thereon. An energy absorbing position lock member 140 is received within the channel 130 and interacts with the portion of the energy absorbing load adjustor 135 having teeth to maintain the position of the energy absorbing load adjustor 135.

Figure 3:
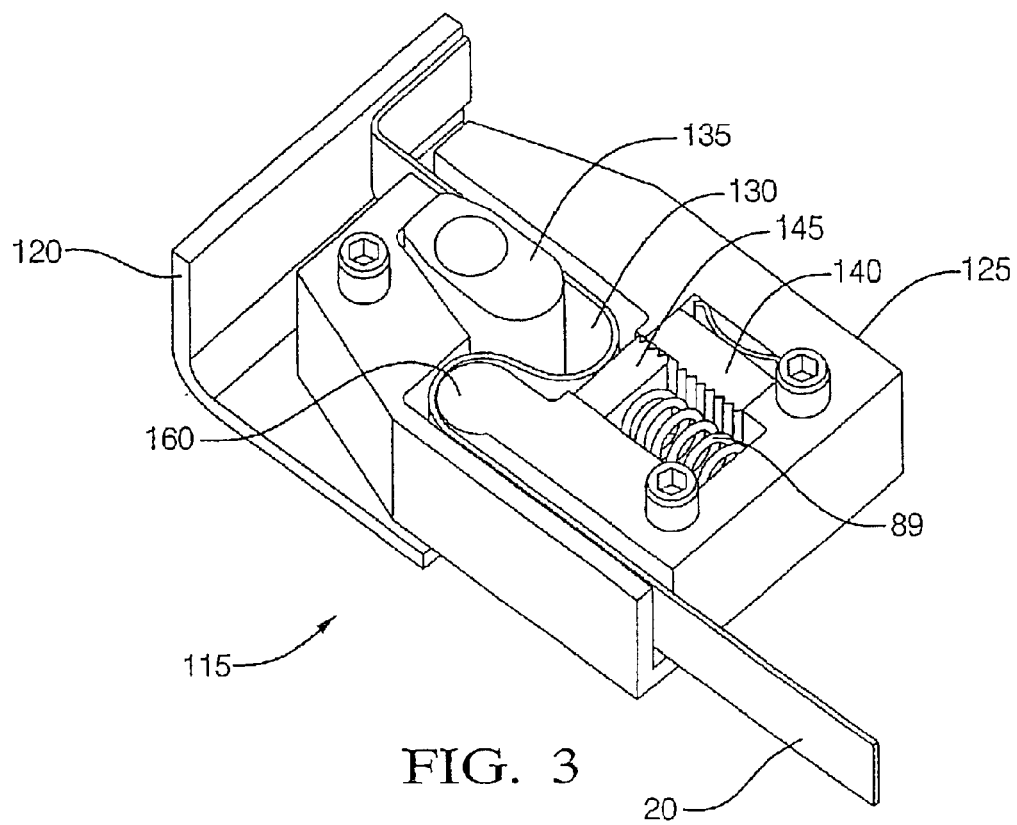
FIG. 3 is a bottom view of a second embodiment of the present invention detailing a strap and reaction members in a minimal energy absorbing state.

With reference to FIG. 3, there is shown a bottom view of the second embodiment of the energy absorbing capsule 125 of the present invention. As can be seen, the stationary reaction member 25 preferably comprises an integrally formed shoulder 160. The metal strap 20 is positioned to engage the shoulder 160, as well as the energy absorbing load adjustor 135 that is fixed to a vehicle body. As with the design of the first embodiment, a spring 89 is positioned at an end of the channel 130 and interacts with the energy absorbing load adjustor 135 to synchronize movement corresponding to the force of impact by the operator.

Again, similar to the first embodiment, the total active surface area for engaging the deformable strap 20 is variable corresponding to a magnitude of the force of impact by an operator.

Unlike the first embodiment in which the energy absorbing load adjustor 95 causes movement of a pin 74 that comprises the moveable reaction member 30 to vary the amount of resistance force, the capsule 125 of the second embodiment moves relative to the energy absorbing load adjustor 135 thereby varying the active surface area in contact with the metal strap 20.

Figure 5:
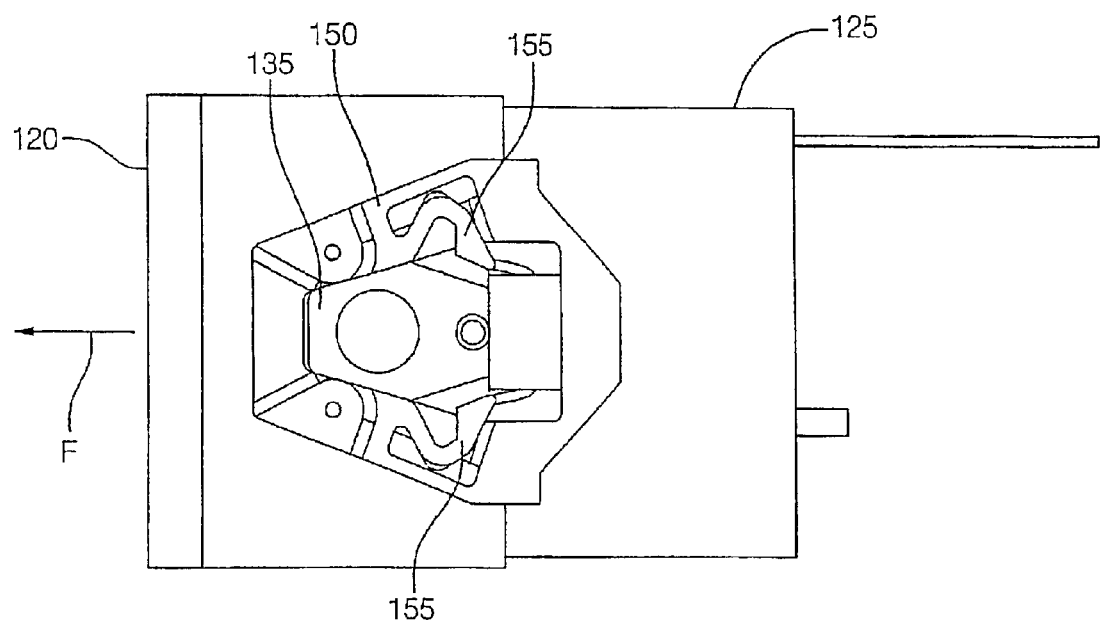
FIG. 5 is a top view of the second embodiment detailing the load release portion at rest.
Figure 6:
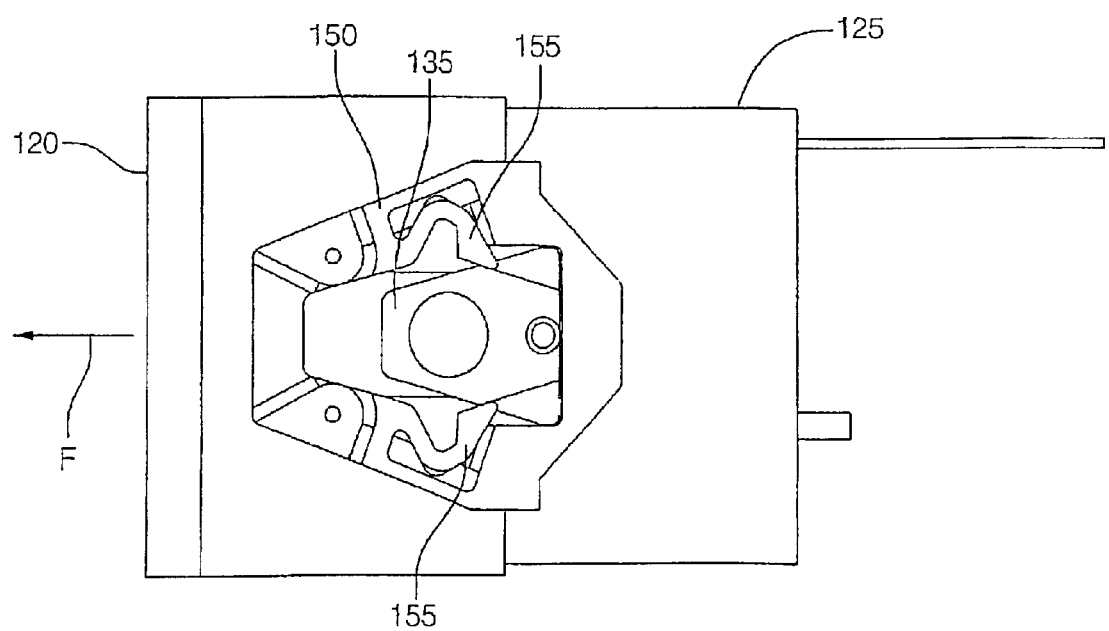
FIG. 6 is a top view of the second embodiment detailing the load release portion having the maximum flex of the load release fingers.
Figure 7:
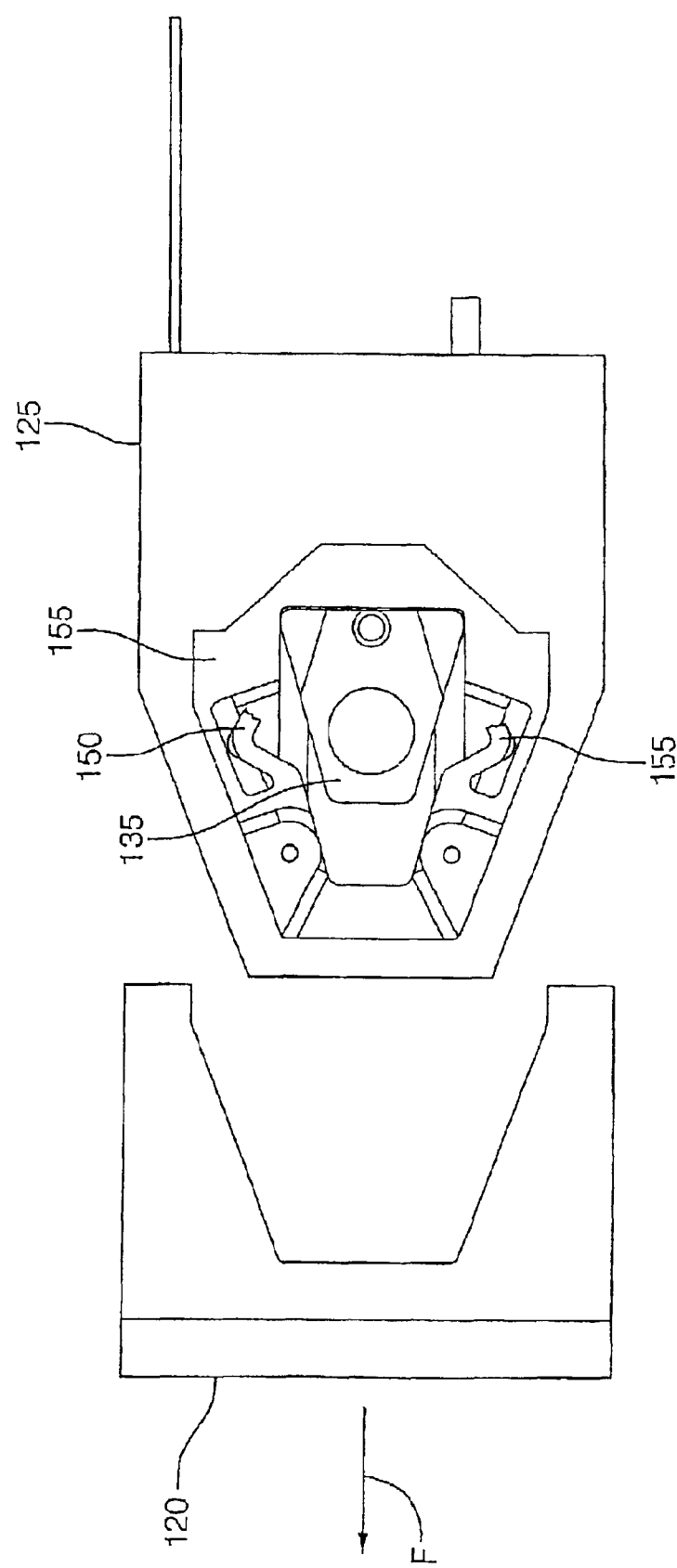
FIG. 7 is a top view of the second embodiment detailing the energy absorbing capsule and rake bracket after the fingers have been sheared by a sufficient force.

With reference to FIGS. 5–7, there is shown a top view of the second embodiment detailing the engagement of the capsule 125 with the rake bracket 120. As can be seen, the capsule 125 includes a load release portion 150 that adjusts the release force necessary to separate the energy absorbing capsule 125 from the rake bracket 120. The load release portion 150 generally comprises a pair of fingers 155 that engage the energy absorbing load adjustor 135. When the force "F" designated by the arrow in FIGS. 5–7, corresponding to the impact force of an operator is applied to the rake bracket 120, the fingers 155 initially start in a rest position as is shown in FIG. 5. The fingers 155 flex until they reach their maximum as shown in FIG. 6. Additional force applied beyond the amount necessary to reach the maximum flex of FIG. 6, results in a shearing of the fingers 155 as shown in FIG. 7, resulting in a separation of the energy absorbing capsule 125 from the rake bracket 120. Preferably, the fingers 155 are formed of plastic that is injected during a forming process of the capsule 125. Obviously, use of varying plastic materials having different flexibilities can be utilized to vary the amount of force necessary to shear the capsule 125 from the rake bracket 120.

Figure 4:
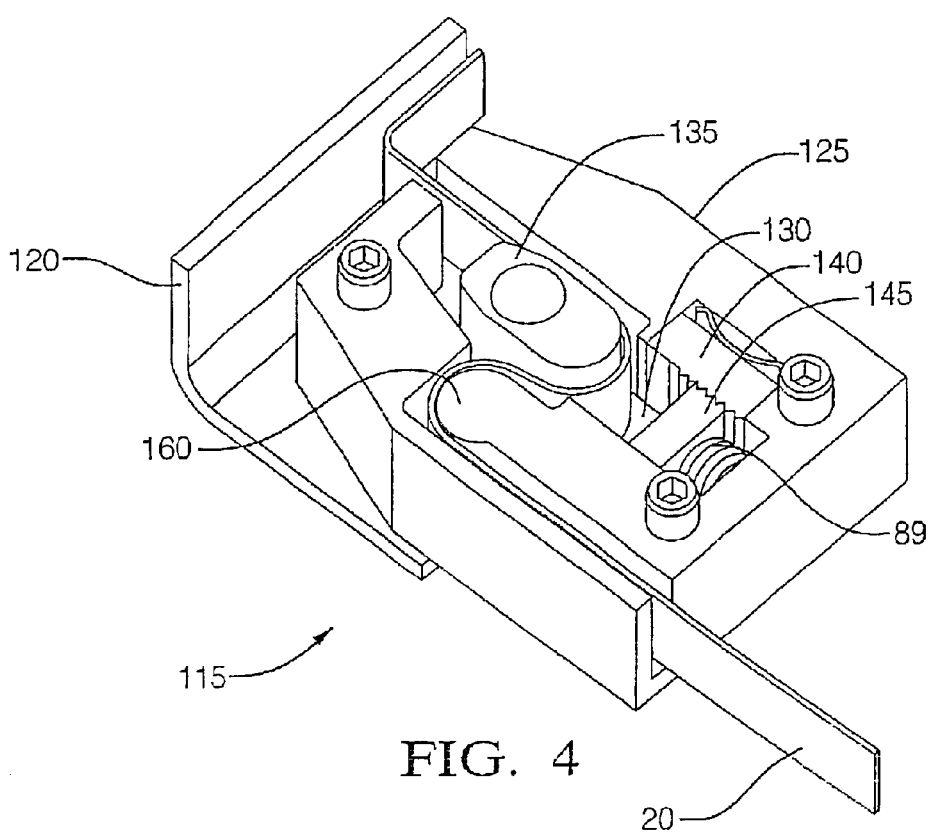
FIG. 4 is a bottom view of the second embodiment detailing the strap and reaction members fully engaged in a maximum energy absorbing state.

In operation, at the onset of linear translation of the steering column housing 10 initiated by the impact force "F" in the direction of the arrow as seen in FIGS. 3 and 4, the rake bracket 120 moves in a direction of the force "F". Movement of the rake bracket 120 in turn results in movement of the capsule 125 relative to the energy absorbing load adjustor 135 that is fixed to the vehicle. Movement of the capsule 125 relative to the energy absorbing load adjustor 135 results in a variance of the active surface area engaging the strap 20; thereby, varying the resistance force for resisting movement of the steering column housing 10 along the collapse stroke.

The rake bracket 120 continues to move the capsule 125 in the direction of the force; thereby, increasing the resistance force until the load release portion 150 comprising the pair of fingers 155 shears, as seen in FIG. 7, resulting in a separation of the rake bracket 120 from the energy absorbing capsule 125. The kinetic energy of the operator has, therefore, been converted into work, and a resistance force proportional to the impact force of the operator has been generated.

While preferred embodiments are disclosed, a worker in this art would understand that various modifications would come within the scope of the invention. Thus, the following claims should be studied to determine the true scope and content of this invention.

What is claimed is:

1. An intractive energy absorbing system comprising:
    a steering column housing moveable along a collapse stroke corresponding to a force of impact by an operator;
    an energy absorbing component exerting a resistance force for resisting movement of the steering column housing along the collapse stroke, the energy absorbing component including a deformable strap engaging a stationary reaction member and a moveable reaction member, the stationary and moveable reaction members having an adjustable total active surface area for engaging the deformable strap and generating the resistance force;
    the moveable reaction member moving to adjust the total active surface area in response to application of the force of impact by the operator whereby the resistance force exerted by the energy absorbing component is caused to vary as a function of a magnitude of the force of impact thereby optimizing the performance of the energy absorbing system.

2. The interactive energy absorbing system of claim 1 wherein the steering column housing includes a column bracket attached thereto, the column bracket having a slot formed therein.

3. The interactive energy absorbing system of claim 2 wherein the slot includes teeth formed on a bottom edge.

4. The interactive energy absorbing system of claim 2 further including a mounting bracket attached to a vehicle structure, the mounting bracket positioned laterally with respect to the column bracket.

5. The interactive energy absorbing system of claim 4 further including a bolt received within the slot of the column bracket, the bolt including a tooth lock formed on at least one end.

6. The interactive energy absorbing system of claim 5 wherein the tooth lock includes teeth formed thereon, the teeth of the tooth lock formed to engage teeth defined by the mounting bracket.

7. The interactive energy absorbing system of claim 6 wherein the energy absorbing component comprises an energy absorbing cartridge having a bore formed therein, the bore receiving an energy absorbing load adjustor.

8. The interactive energy absorbing system of claim 7 wherein the energy absorbing load adjustor further includes teeth formed thereon for engaging the tooth lock.

9. The interactive energy absorbing system of claim 7 wherein the moveable reaction member is attached to the energy absorbing load adjustor.

10. The interactive energy absorbing system of claim 7 wherein the energy absorbing cartridge further includes a slot formed therethrough corresponding to a path of the bore, the slot receiving the moveable reaction member.

11. The interactive energy absorbing system of claim 7 wherein the energy absorbing cartridge further includes a spring positioned at an end of the bore, the spring engaging the energy absorbing load adjustor for synchronizing the movement of the energy absorbing load adjustor according to the force of impact of the operator.

12. The interactive energy absorbing system of claim 1 wherein the interactive energy absorbing system includes two energy absorbing components positioned on opposite sides of the steering column housing.

13. The interactive energy absorbing system of claim 1 wherein the steering column housing includes a rake bracket attached thereto.

14. The interactive energy absorbing system of claim 13 wherein the rake bracket is coupled to the energy absorbing component.

15. The interactive energy absorbing system of claim 14 wherein the energy absorbing component comprises an energy absorbing capsule.

16. The interactive energy absorbing system of claim 15 wherein the energy absorbing capsule includes a channel formed therein, the channel receiving an energy absorbing load adjustor.

17. The interactive energy absorbing system of claim 16 further including an energy absorbing position lock member for maintaining the position of the energy absorbing load adjustor.

18. The interactive energy absorbing system of claim 16 wherein the energy absorbing load adjustor is fixed to a vehicle body.

19. The interactive energy absorbing system of claim 17 wherein the energy absorbing load adjustor includes a portion having teeth formed thereon for engaging the energy absorbing position lock member.

20. The interactive energy absorbing system of claim 15 wherein the energy absorbing capsule includes a load release portion for adjusting the release force necessary to separate the energy absorbing capsule from the rake bracket.

21. The interactive energy absorbing system of claim 20 wherein the load release portion comprises a pair of fingers that engage the energy absorbing load adjustor, the fingers flexing until a sufficient force is applied to shear the fingers and allow separation of the energy absorbing capsule from the rake bracket.

22. The interactive energy absorbing system of claim 15 wherein the energy absorbing capsule includes an integrally formed shoulder comprising the stationary reaction member.

23. The interactive energy absorbing system of claim 16 further including a spring positioned at an end of the channel, the spring engaging the energy absorbing load adjustor for synchronizing movement Of the capsule relative to the energy absorbing load adjustor according to the force of impact of the operator.

24. An interactive energy absorbing system comprising:
a steering column housing moveable along a collapse stroke corresponding to a force of impact by an operator;
an energy absorbing cartridge exerting a resistance force for resisting movement of the steering column housing along the collapse stroke, the energy absorbing cartridge having a bore formed therein, the bore receiving an energy absorbing load adjustor;
a deformable strap engaging a stationary reaction member and a moveable reaction member, the stationary and moveable reaction members having an adjustable total active surface area for engaging the deformable strap and generating the resistance force;
the moveable reaction member coupled to the energy absorbing load adjustor for adjusting the total active surface area in response to application of the force of impact by the operator whereby the resistance force exerted by the energy absorbing component is caused to vary as a function of a magnitude of the force of impact by the operator.

25. An interactive energy absorbing system comprising:
a steering column housing moveable along a collapse stroke corresponding to a force of impact by an operator, the steering column housing having a rake bracket attached thereto;
an energy absorbing capsule exerting a resistance force for resisting movement of the steering column housing along the collapse stroke, the energy absorbing capsule attached to the rake bracket, the energy absorbing capsule having a channel formed therein, the channel receiving an energy absorbing load adjustor that is fixed to a vehicle body;
a deformable strap engaging a stationary reaction member and a moveable reaction member, the stationary and moveable reaction member having an adjustable total active surface area for engaging the deformable strap and generating the resistance force; the moveable reaction member adjusting the total active surface area according to movement of the capsule relative to the energy absorbing load adjustor the movement in response to application of the force of impact by the operator whereby the resistance force exerted by the energy absorbing component is caused to vary as a function of a magnitude of the force of impact by the operator.

* * * * *